United States Patent Office 3,629,398
Patented Dec. 21, 1971

3,629,398
FOAMABLE TOOTHPASTES
William H. Schmitt, Elmhurst, Ill., assignor to Alberto-Culver Company, Melrose Park, Ill.
No Drawing. Filed Aug. 13, 1968, Ser. No. 752,185
Int. Cl. A61k 7/16
U.S. Cl. 424—43    10 Claims

ABSTRACT OF THE DISCLOSURE

Foamable toothpaste, adapted to be packaged in conventional non-pressurized containers as, for example, metal or plastic collapsible or squeezable toothpaste tubes, comprising substantially anhydrous compositions containing a compressible water-insoluble gas, particularly in the form of an aliphatic hydrocarbon or halogenated hydrocarbon, dissolved in an organic solvent, such as a polyethylene glycol, which organic solvent is also water-soluble, and a surface active agent, with or without supplemental ingredients such as abrasive agents, flavoring agents, etc. When said toothpaste is wetted with water and brushed against teeth in the mouth, said dissolved compressible gas is displaced from said organic solvent and is released in the form of a gas to form a foam in the mouth.

---

This invention relates to novel foamable toothpastes which are adapted to be packaged in conventional non-pressurized containers, particularly metal or plastic collapsible or squeezable toothpaste tubes.

The toothpaste compositions of my invention are substantially or essentially non-aqueous or anhydrous non-toxic compositions of that type which, when brought into contact with water in the mouth, evolves a gas which, in turn, causes a mechanical action leading to foam formation and spreading. Broadly speaking, dentifrices, specifically powder dentifrices, which form and evolve gases on contact with water have long been known, gas formation resulting from the release of oxygen-containing compounds as perborates, or by the interaction of an acid such as tartaric acid or citric acid with sodium bicarbonate. Such dentifrices are unsatisfactory for daily use and have come into only minor usage due at least, in part, to the fact that chronic usage of oxygen-containing compounds causes hypertrophied filiform papillae of the tongue ("hairy tongue") and because of the inherent danger of attack of tooth enamel associated with usage of unneutralized tartaric or citric acid.

The foamable toothpastes of my present invention are radically different from those of the previously known types referred to above and operate on an entirely unrelated principle of gas formation and evolution. The foamable toothpastes of my invention utilize as a base a non-aqueous organic solvent in which certain types of compressible gases are dissolved, thereby reducing their vapor pressures. The organic solvent must also be water-soluble whereby, when water is added to the system, the release of the compressible gas in gaseous form is effected by reason of the insolubility of the compressible gas in the non-aqueous organic solvent and water solution. In broad terms, the toothpaste compositions of my invention comprise a compressible water-insoluble gas, an organic solvent which is water-soluble and in which said compressible water-insoluble gas is soluble, a surface active agent or surfactant, and such additional ingredients as are included in a toothpaste, said composition being thickened so as to convert it into the form of a paste. The toothpaste composition may, and usually will, contain various supplemental agents, notably abrasive agents, flavor or perfume agents, etc.

Any volatile organic material which exists as a gas at body temperatures (and ambient or atmospheric pressure) and which exists as a liquid at body temperatures under superatmospheric pressures, and is soluble in the organic solvent (or mixtures thereof) utilized, and is substantially insoluble in water, can be used as the gas-producing agent. Especially suitable are the $C_3$–$C_6$ aliphatic hydrocarbons, namely, liquified propane, n-butane, isobutane, isobutylene, n-pentane, isopentane, n-hexane, and hexene-2; and halogenated aliphatic hydrocarbons which contain from 1 to 2 carbon atoms and include, by way of example, vinyl chloride, ethyl chloride, dichlorodifluoromethane, monochlorodifluoromethane, dichlorotetrafluoroethane, trichlorofluoromethane, trichlorofluoroethane, difluoroethane, difluoromonochloroethane, trichlororotrifluoroethane, and mixtures of two or more thereof, most desirably the saturated hydrocarbons and halogenated saturated aliphatic hydrocarbons. The boiling points of said aliphatic hydrocarbons and halogenated aliphatic hydrocarbons should fall within the range of about $-30°$ C. to about $60°$ C. at atmospheric pressure, preferably about $3°$ C. to about $37°$ C. The proportions thereof in the toothpastes of the present invention will, in general, range from about 1 to about 20%, by weight, preferably about 5 to about 10%. The vapor pressure of the finished toothpaste is, in general, in the range of from 0 to 10 p.s.i.g., at $25°$ C. and not greater than about 15 p.s.i.g. at $50°$ C.

The organic solvent utilized is one in which the aliphatic hydrocarbons or halogenated aliphatic hydrocarbons utilized are soluble. In addition, said organic solvent must also be water-soluble. It is especially desirable to utilize, as the organic solvent, water-soluble polyethylene glycols such as polyethylene glycol 200, 400, 600, 800, and higher polyethylene glycols and the like. Various aliphatic polyhydric alcohols such as glycerol, monoalkylene and polyalkylene glycols in which the alkylene groups contain from 2 to 4 carbon atoms, such as ethylene glycol, propylene glycol, 1,3-butylene glycol, hexylene glycol, diethylene glycol, triethylene glycol, tetraethylene glycol and higher polyethylene glycols, such as those mentioned above, can be employed. The organic solvent may also be a non-ionic surface active agent in the form of a water-soluble alkylene oxide, particularly ethylene oxide, adduct of a fatty or aliphatic long chain (straight or branched) alcohol or of an alkyl phenol as, for example, 8 to 20 mol ethylene oxide adducts of octyl alcohol, decyl alcohol, dodecyl alcohol, tridecyl alcohol, oxo-tridecyl alcohol, diamylphenol, dinonylphenol, and the like. Non-ionic compounds such as, for example, those sold under the designation "Pluronics" can function, in the foamable toothpaste compositions of my present invention, simultaneously as thickeners, surfactants and organic solvents. The "Pluronics" are condensates or adducts of ethylene oxide with polypropylene glycols of molecular weight 1200 or higher and vary in physical properties from liquids through pastes to solids. The pastes are advantageously used for thickening and, as stated, they also have surfactant and organic solvent properties. The "Pluronics" are disclosed, for instance, in U.S. Patents Nos. 2,674,619 and 2,677,700.

Mixtures of such organic solvents can be utilized and such mixtures may include monohydric alcohols such as ethyl alcohol. However, because of solvency and other practical considerations, it is particularly advantageous, as indicated above, to employ polyethylene glycols or mixtures thereof having molecular weights in the range of about 200 to 6000. The proportions of the organic solvent or solvents utilized in the toothpastes of my invention are variable but will, in general, lie in the range of about 20 to about 80%, by weight, particularly about 40 to about 70% in the case of the aforesaid polyethylene glycols.

The abrasive agent or agents may be any one or more of those which, for instance, are commonly used in toothpastes. These include, by way of illustration, precipitated calcium carbonate, dicalcium phosphate, tricalcium phosphate, magnesium carbonate, magnesium oxide, insoluble sodium metaphosphate, zinc oxide, stannic oxide, calcium sulfate, calcium pyrophosphate, hydrated alumina, and the like. The proportions of the abrasive agent or agents are likewise variable but, in any case, are substantial, generally ranging from about 10 to about 60%, by weight, preferably about 15 to about 30%.

To provide a paste of proper viscosity or consistency for dispensing from conventional collapsible metal or plastic squeezable toothpaste tubes, suitable thickening agents or binders can be utilized, illustrative thereof being high molecular weight polyalkylene or polyethylene glycols such as polyethylene glycol 4000 and 6000; colloids or gums such as gum arabic, gum tragacanth, gum karaya, "Carbopol 934," Irish moss and sodium alginate; silicates, bentonite, methyl cellulose, carboxymethyl cellulose, and the like. The proportions of the thickening agent are variable, being dependent upon the nature thereof and the particular consistency desired in the final toothpaste.

The surface-active agents or surfactants include, for instance, saponaceous materials such as ordinary soaps, and synthetic detergents of anionic and/or non-ionic character as, by way of illustration, sodium lauryl sulfate, dodecylbenzene sodium sulfonate, lauryl sodium sulfoacetate, higher fatty acid monoglyceride sodium sulfates, dioctyl sodium sulfosuccinate, sulfocolaurate (K salt), sodium N-lauroyl sarcosinate, 4 to 6 mol ethylene oxide adducts of lauryl alcohol and similar adducts of higher alkylphenols such as nonylphenol. The foregoing, it will be noted, are non-cationic surface-active agents or surfactants. The proportions of the soap and/or detergent or surface active agents are variable but are generally minor such as, for example, about 0.05 to about 8%, by weight, usually about 1 to about 3%.

Supplemental agents which can be utilized include, among others, flavoring, sweetening and perfume agents, colors, preservatives, and caries inhibiting agents, etc. such as sugars, glycerol, propylene glycol, sorbitol, fluorides, and enzymes such as diastatic enzymes and proteolytic enzymes or mixtures thereof.

I have also found that, in toothpaste compositions of the type contemplated by my present invention, the rate of release of the gas can be selectively controlled when the toothpaste is contacted with water in the mouth of the user. Generally speaking, it is necessary to use surfactants or surface active agents in toothpaste which function as detergents or cleaning agents. Their very surfactancy tends to inhibit the rate of release of the compressible gas components when employed as ingredients in conjunction with the other ingredients. I have discovered that various compounds are highly effective in accelerating the release of the gas, in the foregoing surfactant inhibited environment, namely, non-ionic compounds, exemplified by sugar alcohols such as sorbitol, mannitol and arabitol, especially sorbitol, said sugar alcohols being insoluble in the toothpaste system. The sugar alcohols, of course, are utilized in their anhydrous or essentially anhydrous form, the sorbitol being employed in the form of a powder. Other gas release accelerating agents which can be used are ionic compounds, exemplified by monovalent or polyvalent salts, such as sodium chloride, sodium bicarbonate, sodium tartrate, sodium citrate, and calcium citrate. Generally speaking, the ionic gas releasing agents are more effective than the non-ionic gas releasing agents, although the non-ionic are ordinarily easier to flavor. Sodium bicarbonate is especially satisfactory and it is employed in minor proportions in the toothpaste composition, preferably from about 10 to 18% by weight of the toothpaste, or somewhat more or less, with about 15% being a good average. Similarly, others of the gas release accelerating agents can be used in generally the same amounts, depending upon the extent of the desired acceleration as well as taste or other or similar considerations.

The following examples are illustrative of foamable toothpastes made in accordance with my invention. It will be understood that numerous other foamable toothpastes can readily be made in the light of the guiding principles and teachings of the present invention disclosed above. The examples given are, therefore, by way of illustration and not by way of limitation. All parts listed are in terms of weight.

EXAMPLE 1

| | Parts |
|---|---|
| Polyethylene glycol 400 | 50 |
| Polyethylene glycol 4000 | 9 |
| Trichlorofluoromethane | 5 |
| Methyl paraben | 0.25 |
| Sodium saccharin | 0.15 |
| Sodium cyclamate | 0.6 |
| Sorbitol (powder) | 15 |
| Dicalcium phosphate (anhydrous) | 15 |
| Sodium lauryl sulfate | 1.5 |
| Spearmint oil (terpeneless) | 1 |
| Hydrogenated castor oil | 2 |

The polyethylene glycol 400 and 4000 were melted together and the methyl paraben, sodium saccharin, sodium cyclamate, sorbitol, and dicalcium phosphate were milled thereinto to form a paste. The paste was deaerated by mixing under vacuum and was then chilled to about 15° C. The spearmint oil, sodium lauryl sulfate and hydrogenated castor oil were blended into the trichlorofluoromethane at about 10° C. and the said blend was then admixed with the cold paste. The final composition was placed in conventional collapsible tubes. The resultant toothpaste, when used to brush the teeth, liberated trichlorofluoromethane gas in the mouth, producing foam and spreading the paste. The filled, capped tubes were stable when stored at temperatures up to 50° C.

EXAMPLE 2

| | Parts |
|---|---|
| Polyethylene glycol 400 | 41 |
| Polyethylene glycol 4000 | 15.5 |
| Polyethylene glycol 6000 | 10 |
| 1,1-dichloro-1,2,2,2-tetrafluoroethane | 2 |
| Methyl paraben | 0.25 |
| Sodium saccharin | 0.15 |
| Sodium cyclamate | 0.6 |
| Sodium bicarbonate (powder) | 15 |
| Calcium carbonate | 15 |
| Anise oil | 0.5 |
| Sodium lauryl sulfoacetate | 2 |

The polyethylene glycols were mixed together and then the methyl paraben, sodium saccharin, sodium cyclamate, sodium bicarbonate, and calcium carbonate were incorporated thereinto and the resulting paste milled. The paste was then deaerated under vacuum. The anise oil, a part of the 1,1-dichloro-1,2,2,2-tetrafluoroethane and the sodium lauryl sulfoacetate were admixed to form a homogeneous blend and incorporated and then the balance of the 1,1-dichloro-1,2,2,2-tetrafluoroethane was added to give a final finished composition of 2% 1,1-dichloro-1,2,2,2-tetrafluoroethane. The resultant toothpaste was placed in conventional tubes which were then capped. The filled tubes were stable under normal storage conditions. The toothpaste, when used to brush the teeth, liberated a foam which also served to spread the toothpaste.

EXAMPLE 3

| | Parts |
|---|---|
| Polyethylene glycol 400 | 46 |
| Polyethylene glycol 4000 | 9 |
| Aluminum stearate | 5 |
| Methyl paraben | 0.2 |
| Sodium saccharin | 0.3 |

|                                  | Parts |
| --- | --- |
| Sodium cyclamate                 | 1.2   |
| Dicalcium phosphate anhydrous    | 30.55 |
| Trichlorofluoromethane           | 5     |
| Sodium lauryl sulfate            | 1     |
| Spearmint oil (terpeneless)      | 0.6   |
| Peppermint oil (terpeneless)     | 0.4   |
| Plural enzyme [1]                | 0.75  |

[1] Obtained from a mutated *Bacillus subtilis* organism and containing, as major components, a neutral protease, an alkaline protease, and alpha amylase. Active against carbohydrate and proteinaceous materials which are commonly encountered in plaque and tooth stains. Sold under the trade designation "Monsanto Enzyme AP" (Monsanto Company).

This toothpaste is made generally following the procedure described in the foregoing examples. It exhibited no distinctive enzyme or protein flavor and, upon contact with water, formed a foam, the agitation from said foam formation aiding in the dispersion and activation of the enzyme system.

The toothpaste is desirably filled into the usual types of non-pressurized container, particularly metal or plastic collapsible or squeezable toothpaste tubes. In use for the brushing of the teeth in the mouth, the toothpaste is squeezed from the tube onto the toothbrush in the same way as ordinary toothpaste. The brush is then wetted with water and applied to the teeth by brushing the same. When the substantially or essentially non-aqueous or anhydrous toothpaste comes into contact with water, the aliphatic hydrocarbon and/or halogenated aliphatic hydrocarbon is displaced from or thrown out of solution in the organic solvent and, at the temperature in the mouth, boils out as a gas which forms a foam with the water and other ingredients of the toothpaste. The foam is carried into the crevices between the teeth, and, in contacting the food particles and debris in the mouth and on or adjacent the teeth, effectively removes said food particles and debris which are then readily washed away upon rinsing of the mouth with water.

I am aware that it has heretofore been disclosed to prepare self-foaming toothpastes, which are adapted to be packaged in flexible packages, such as collapsible or squeezable metallic tubes, plastic containers, and the like and which, when spread out in a thin layer, foam spontaneously. Such toothpastes, which are disclosed in U.S. Patent No. 2,995,521, comprise a mixture of (a) at least one substance of the class of $C_5$ to $C_6$ saturated aliphatic hydrocarbons and various Freons jellified with aluminum octoate, and (b) a mixture of a plurality of ingredients comprising precipitated calcium carbonate, soap, sugar, talc, glycerine and a substantial content of water, the water constituting about 20% of the (b) mixture and about 16% of the toothpaste as a whole. The gas is suspended in a metastable state in the examples as described in the above patent, and the release of the gas is effected by the spreading out of the compositions in a thin layer. The toothpastes of my invention are sharply distinguishable therefrom in a number of particulars in that, for instance, my toothpastes are anhydrous or substantially anhydrous, and the gas-producing agent or agents are in solution in an organic solvent and are displaced or released from said solution when contacted with water and issue as a gas at the temperatures encountered in the mouth. Moreover, toothpastes made in accordance with my invention are far more effective in forming cleansing foams in the mouth than is the case with toothpaste compositions disclosed in or suggested by said Patent No. 2,995,521.

I am also aware that it has been suggested to prepare foam producing compositions for dispensing from aerosol containers, as disclosed, for instance, in U.S. Patent No. 3,131,153, said compositions containing (a) an alcohol or dialkyl ketone, (b) glycerol or an alkylene glycol such as polyethylene glycol 200, 400, 600, etc., (c) a surface active agent, and (d) a propellant in the form of a liquified normally gaseous aliphatic hydrocarbon or halogenated aliphatic hydrocarbon such as butanes or pentanes or dichlorodifluoromethane or dichlorotetrafluoroethane. Such foam producing compositions are suggested for use as pre-electric shave lotions, after-shave lotions, astringents, colognes, hair-coloring tints, hair dressings, etc. My toothpastes are sharply distinguishable from the foam producing compositions of said patent in that, in addition, the compositions of said patent are in the form of clear, homogeneous liquids and which, as stated above, are dispensed from aerosol containers. My toothpastes, in sharp contrast, not only are packaged in ordinary or conventional non-pressurized containers such as squeezable metal or plastic toothpaste tubes, but, indeed, if simply placed as such, and without more, in an aerosol container, would not be dispensable therefrom.

I claim:

1. A foamable toothpaste comprising a substantially non-aqueous paste composition containing, as essential ingredients, from about 20 to about 80% of a water-soluble organic solvent selected from the group consisting of glycols, aliphatic polyhydric alcohols, monoalkylene and polyalkylene glycols in which the alkylene groups contain from 2 to 4 carbon atoms, and non-ionic surface-active agents in the form of alkylene oxide adducts of aliphatic long chain alcohols and of alkyl phenols and ethylene oxide adducts of polypropylene glycols; from about 1 to about 20% of a compressible gas which is substantially water-insoluble but which is soluble in said organic solvent, said compressible gas existing as a gas at body temperature and existing as a liquid at body temperature under superatmospheric pressures, said compressible gas being selected from the group consisting of $C_3$–$C_6$ aliphatic hydrocarbons, chlorinated aliphatic hydrocarbons containing from 1 to 2 carbon atoms, fluorinated aliphatic hydrocarbons containing from 1 to 2 carbon atoms, and chlorinated-fluorinated aliphatic hydrocarbons containing from 1 to 2 carbon atoms, and from about 0.05 to about 8% of a non-cationic surface-active agent, said percentages being by weight of said foamable toothpaste, the vapor pressure of said toothpaste being in the range of from 0 to 10 p.s.i.g. measured at 25° C. and not greater than about 15 p.s.i.g. measured at 50° C., said compressible gas being released as a gas in the presence of water and forming a foam in the mouth.

2. A foamable toothpaste according to claim 1, including a gas release accelerating agent selected from the group consisting of sodium chloride, sodium bicarbonate, sodium tartrate, sodium citrate and calcium citrate.

3. A foamable toothpaste according to claim 1, in which the organic solvent comprises a polyethylene glycol having a molecular weight in the range from about 200 to about 6000.

4. A foamable toothpaste according to claim 1, in which the organic solvent comprises a polyethylene glycol having a molecular weight in the range from about 400 to about 800, and in which the compressible gas is selected from the group consisting of $C_3$ to $C_6$ saturated aliphatic hydrocarbons and halogenated $C_1$ to $C_2$ saturated aliphatic hydrocarbons.

5. A foamable toothpaste according to claim 4, in which the compressible gas is a chlorofluoro $C_1$–$C_2$ aliphatic hydrocarbon.

6. A foamable toothpaste according to claim 5, in which the compressible gas is trichlorofluoromethane.

7. A foamable toothpaste according to claim 5 in which polyethylene glycol is one having a molecular weight of about 400, said polyethylene glycol comprising about 40 to 70% by weight of the toothpaste.

8. A squeezable toothpaste tube containing therein a foamable toothpaste in the form of a substantially non-aqueous composition comprising (a) from about 5 to about 10% of a compressible gas in the form of at least one member selected from the group consisting of $C_3$–$C_6$ aliphatic hydrocarbons and $C_1$–$C_2$ chlorinated-fluorinated aliphatic hydrocarbons, (b) from about 40 to about 70% of an organic solvent which is water-soluble and in which said (a) ingredient is soluble, said organic solvent being selected from the group consisting of glycols, aliphatic polyhydric alcohols, monoalkylene and polyalkylene glycols in which the alkylene groups contain from 2 to 4 carbon atoms, and non-ionic surface active agents in the form of alkylene oxide adducts of aliphatic long chain alcohols and fo alkyl phenols and ethylene oxide adducts of polypropylene glycols; about 10 to about 30% of a toothpaste abrasive agent, a thickening agent, and about 1 to about 3% of a non-cationic saponaceous or detergent agent, said composition having a vapor pressure of about 0 to about 10 p.s.i.g. at 25° C. and not greater than about 15 p.s.i.g. at 50° C. said toothpaste, in contact with water in the mouth, releasing said compressible gas in gaseous form to form a foam in the mouth.

9. The article of claim 8 in which the detergent agent is sodium N-lauroyl sarcosinate.

10. A non-pressurized container containing therein a foamable toothpaste comprising a substantially non-aqueous paste composition containing, as essential ingredients, from about 20 to about 80% of a water-soluble organic solvent selected from the group consisting of glycols, aliphatic polyhydric alcohols, monoalkylene and polyalkylene glycols in which the alkylene groups contain from 2 to 4 carbon atoms, and non-ionic surface active agents in the form of alkylene oxide adducts of aliphatic long chain alcohols and of alkyl phenols and ethylene oxide adducts of polypropylene glycols; from about 1 to about 20% of a compressible gas which is substantially water-insoluble but which is soluble in said organic solvent, said compressible gas existing as a gas at body temperature and existing as a liquid at body temperature under superatmospheric pressures, said compressible gas being selected from the group consisting of $C_3$–$C_6$ aliphatic hydrocarbons, chlorinated aliphatic hydrocarbons containing from 1 to 2 carbon atoms, fluorinated aliphatic hydrocarbons containing from 1 to 2 carbon atoms, and chlorinated-fluorinated aliphatic hydrocarbons containing from 1 to 2 carbon atoms and from about 0.05 to about 8% of a non-cationic surface active agent, said percentages being by weight of said foamable toothpaste, the vapor pressure of said toothpaste being in the range of from 0 to 10 p.s.i.g. measured at 25° C. and not greater than about 15 p.s.i.g. measured at 50° C., said compressible gas being released as a gas in the presence of water and forming a foam in the mouth.

References Cited

UNITED STATES PATENTS 3,131,153   4/1964   Klausner _____ 424—80

RICHARD L. HUFF, Primary Examiner

U.S. Cl. X.R.

424—52, 55; 252—126, 127